United States Patent Office 2,964,520
Patented Dec. 13, 1960

2,964,520

WATER-INSOLUBLE DYESTUFFS OF THE MONOHALOGENO-TRIAZINE-AMINO ALKYLENE AMINO-AZOBENZENE SERIES

Ronald Baker, Harry Rose Hadfield, Eric Leslie Johnson, and William Elliot Stephen, Manchester, England, assignors to Imperial Chemical Industries Limited, London, England, a corporation of Great Britain No Drawing. Original application June 7, 1957, Ser. No. 664,189. Divided and this application Apr. 9, 1959, Ser. No. 805,121

6 Claims. (Cl. 260—153)

This invention relates to new azo dyestuffs and more particularly it relates to new water-insoluble azo dyestuffs especially useful for the dyeing of artificial textile fibres.

It has previously been proposed to manufacture azo dyestuffs containing one or more cyanuric nuclei by uniting azo dyestuffs containing appropriate groupings, either to each other, or to other complexes, radicals or suitable residues by reaction with the halogen of cyanuric halides.

When azo dyestuffs containing at least one triazine nucleus carrying at least one halogen atom and which contain sulphonic acid or carboxylic acid groups are used for the dyeing of polyamide fibres such as polyhexamethylene adipamide, they dye the polyamide fibres in colourations which have good fastness to wet treatments, but which are uneven in depth of shade.

We have now prepared azo dyestuffs which are free from water-solubilising groups and which contain a mono-halogenotriazinylamino residue attached to the residue of an aromatic azo compound containing a primary or secondary amino group through an alkylene chain, and we have found that they may be used as dispersed dyestuffs for the dyeing of polyamide fibres to give colourations possessing excellent fastness to wet treatments and which also have a satisfactory levelness of shade.

According to our invention therefore, there are provided the new water-insoluble azo dyestuffs of the formula:

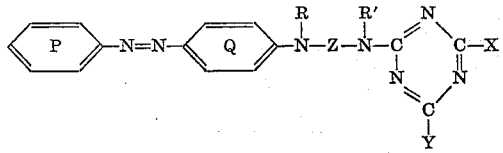

wherein R and R' stand for hydrogen atoms or substituted or unsubstituted hydrocarbon radicals and may be the same or different, X stands for a halogen atom, Y stands for a substituted or unsubstituted alkyl or aryl radical or for a hydroxyl or an amino group or for an organic radical containing a nitrogen, oxygen or sulphur atom through which it is linked to the triazine ring, Z stands for an alkylene radical and the benzene rings P and Q may carry substitutents provided that R, R', Y, P and Q are free from sulpho, sulphato or carboxy groups.

As examples of hydrocarbon radicals represented by R and R' there may be mentioned alkyl such as methyl or ethyl, and aryl such as phenyl. As examples of substituents which may be present in the alkyl radicals represented by R, R' or by Y there may be mentioned hydroxyl, alkoxy such as methoxy, cyano and halogen such as fluorine and as examples of substituents which may be present in the aryl radicals represented by R, R' or by Y there may be mentioned alkyl such as methyl, alkoxyl such as methoxy, halogen such as chlorine or bromine.

As examples of halogen represented by X in the above formula there may be mentioned chlorine and bromine, and as examples of the organic radicals containing a nitrogen, oxygen or sulphur atom and represented by Y in the above formula there may be mentioned alkoxy such as methoxy and ethoxy, aryloxy such as phenoxy, substituted amino such as β-hydroxyethylamino, methylamino, dimethylamino, phenylamino, cyclohexylamino, N-methylphenylamino, β-cyanoethylamino and β-carbethoxyethylamino, and substituted mercapto such as methylmercapto.

As examples of the alkylene radicals represented by Z there may be mentioned ethylene and propylene and as examples of the substituents which may be present in the benzene rings P and Q there may be mentioned, alkyl such as methyl, alkoxy such as methoxy, halogen such as chlorine or bromine, nitro, cyano, alkylsulphonyl such as methylsulphonyl, aminosulphonyl or substituted aminosulphonyl such as methylaminosulphonyl, trifluoromethyl, amino and acylamino such as acetylamino.

According to a further feature of the invention there is provided a process for the manufacture of the new water-insoluble azo dyestuffs, as hereinbefore defined, which comprises reacting an azo compound of the formula:

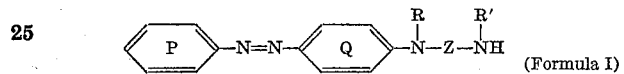

(Formula I)

wherein P, Q, R, R' and Z have the meanings stated above with one molecular proportion of a triazine of the formula:

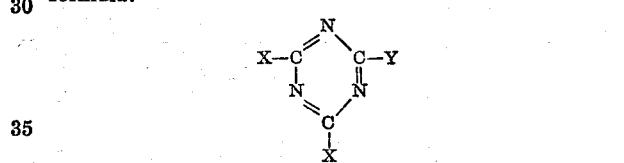

wherein X and Y have the meanings stated above.

As examples of triazines which may be used in this process of the invention there may be mentioned 2:4-dichloro-6-phenoxy-1:3:5-triazine, 2:4-dichloro-6-methoxy-1:3:5-triazine, 2:4-dichloro - 6 - dimethylamino-1:3:5-triazine, 2:4-dichloro-6-phenylamino-1:3:5-triazine, 2:4-dichloro-6-β-cyanoethylamino-1:3:5-triazine, 2:4-dichloro-6-phenyl-1:3:5-triazine, and 2:4-dichloro-6-methyl-1:3:5-triazine.

As examples of azo compounds of the Formula I which may be used in the above process there may be mentioned 2' - chloro-4'-nitro-4-(N-β-hydroxyethyl-N-β-aminoethyl) aminobenzene, 2'-chloro-4'-ethanesulphonyl - 4 - (N-β-hydroxyethyl-N-β-aminoethyl)aminoazobenzene and 4'-cyano - 2' - trifluoromethyl-4-(N-β-hydroxyethyl-N-β-(β-hydroxyethylamino)-ethyl)aminoazobenzene.

The reaction is preferably carried out in a liquid medium, for example acetone, which is a solvent for both the azo compound and for the triazine, or in a mixture of such a solvent with water. The reaction is preferably carried out at a moderately low temperature, for example at a temperature between 30° C. and 50° C., and in the presence of an acid-binding agent for example sodium carbonate or sodium bicarbonate. The products usually separate as insoluble solids from the reaction medium, but, if necessary, may be precipitated by adding water to the reaction medium. They may then be isolated by filtration. It is preferred to dry the products at a relatively low temperature for example between 40° C. and 50° C.

The azo compounds of the Formula I used in this process of the invention may be obtained by diazotising an amine of the formula:

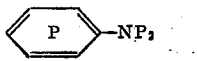

and coupling the diazo compound so obtained with a coupling component of the formula:

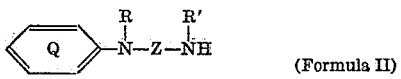
(Formula II)

wherein P, Q, R, R' and Z have the meanings stated above.

According to a further feature of the invention there is provided an alternative process for the manufacture of the new water-insoluble azo dyestuffs as hereinbefore defined which comprises diazotising an aromatic amine of the formula:

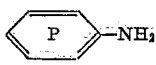

and coupling the diazo compound so obtained with a coupling component of the formula:

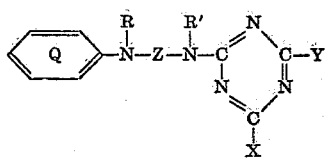

wherein P, Q, R, R', X, Y and Z have the meanings stated above.

As examples of aromatic amines which may be used in this alternative process of the invention there may be mentioned 2-chloro-4-nitroaniline, 2-chloro-4-ethanesulphonylaniline, 4 - cyano - 2 - trifluoromethylaniline and 6-chloro-2:4-dinitroaniline.

The coupling components used in this alternative process may be obtained by interacting a triazine as hereinbefore defined with a coupling component of Formula II. As examples of such coupling components of Formula II there may be mentioned N-ethyl-N-(β-aminoethyl)aniline, N-(β-hydroxyethyl) - N - (β - aminoethyl) aniline and N-β-hydroxyethyl-N-[β-(β-hydroxyethylamino)-ethyl]aniline.

This alternative process of the invention may be conveniently brought about by dissolving or suspending the aromatic amine in an aqueous solution of hydrochloric acid, adding sodium nitrite, adding the diazo solution or suspension so obtained to a solution of the coupling component in a dilute aqueous solution of hydrochloric acid, adding sodium acetate until the mixture is no longer acid to Congo red and filtering off the dyestuff which is precipitated.

According to a further feature of the invention there is provided a modified process for the manufacture of the new water-insoluble azo dyestuffs, as hereinbefore defined, wherein Y stands for a hydroxyl or an amino group or for an organic radical containing a nitrogen, oxygen or sulphur atom through which it is linked to the triazine ring which comprises treating an azo compound of the formula:

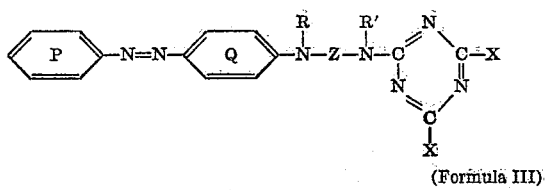
(Formula III)

wherein P, Q, R, R', X and Z have the meanings stated above with a compound of the formula: H—Y wherein Y stands for a hydroxyl or an amino group or for an organic radical containing a nitrogen, oxygen or sulphur atom through which it is linked to the hydrogen atom. As examples of such organic radicals there may be mentioned methoxy, phenoxy, thiophenoxy, methylamino, di-(β-hydroxyethyl)amino, ethylamino and β-hydroxyethylamino.

The above azo compounds of Formula III may be obtained by reaction of a cyanuric halide with an azo compound of Formula I.

This modified process of the invention may be conveniently brought about by heating the azo compound of Formula III and the compound of the formula: H—Y together in a suitable solvent, for example acetone, and in the presence of an acid-binding agent, and filtering off the azo dyestuff which is precipitated. If desired water may be added at the completion of the reaction to ensure complete precipitation of all the azo dyestuff.

For their use in dyeing, the new water-insoluble azo dyestuffs of the invention may be dispersed in aqueous medium by known methods for example by gravel milling with the aid of dispersing agents for example the sodium salt of methylenedinaphthalene sulphonic acid and, if desired, buffering agents may be added to the dispersions to maintain the pH within a range of 6 to 8 to keep to a minimum the removal by hydrolysis of halogen atoms from the triazine nucleus.

The new water-insoluble azo dyestuffs of our invention may be applied from aqueous dispersion either by printing or dyeing methods to animal fibres such as wool and silk and to cellulose esters such as cellulose acetate and cellulose triacetate and they are particularly useful for application to synthetic fibres for example polyamide fibres such as polyhexamethylene adipamide and the polymer from caprolactam and to polyurethane fibres. When so applied they yield dyeings of yellow to red shades having excellent fastness to wet treatments. Where the dyestuffs of the invention contain diazotisable primary amino groups they may be applied to one of the textile fibres described and then diazotised on the fibre and coupled with a suitable coupling component, for example 2-hydroxy-3-naphthoic acid. In this way valuable shades, for example navy blues and blacks may be obtained.

The invention is illustrated but not limited by the following examples in which parts and percentages are by weight:

EXAMPLE 1

55.8 parts of 2-chloro-4-ethylsulphonyl-4'-N-β-hydroxyethyl-N-β-(4:6-dichloro-1:3:5-triazin - 2 - ylamino)-ethylaminoazobenzene are stirred with 280 parts of water and 54 parts of 7.5% aqueous sodium hydroxide solution. The mixture is heated to 90° C. and stirred at this temperature for 12 hours. The mixture is cooled and made slightly acid to Congo red paper by addition of sulphuric acid. The product is filtered off, washed and dried.

The product is 2-chloro-4-ethylsulphonyl-4'-N-β-hydroxyethyl - N - β - (4-chloro-6-hydroxy-1:3:5-triazin-2-ylamino)-ethylaminoazobenzene. It dyes cellulose acetate rayon and nylon from finely-divided aqueous dispersions in orange shades of good fastness to washing.

EXAMPLE 2

55.8 parts of the azo compound used in Example 1 are stirred with 450 parts of acetone and 12.2 parts of monoethanolamine are added. The mixture is heated and stirred at a temperature of 40° C. for an hour, then cooled to 20° C. and 450 parts of water are added slowly. The precipitated product is then filtered off, washed with water and dried.

The product obtained is 2-chloro-4-ethylsulphonyl-4'-N - β - hydroxyethyl-N-β-(4-chloro-6-β-hydroxyethylamino-1:3:5-triazin - 2 - ylamino)ethylaminoazobenzene. It dyes cellulose acetate rayon and nylon from finely-divided aqueous dispersions in orange shades of good fastness to washing.

EXAMPLE 3

A solution of 6.9 parts of sodium nitrite in 50 parts of water is added slowly at 10° C. to a stirred solution of 21.95 parts of 2-chloro-4-ethylsulphonylaniline and 25 parts of 36% aqueous hydrochloric acid in 100 parts of acetic acid. After standing for 10 minutes 100 parts of water are added and the solution of the diazonium compound so obtained is added, at a temperature below 10° C., to a stirred solution in 400 parts of acetone of 32.35 parts of the compound obtained by reacting together equimolecular amounts of 2:4-dichloro-6-methoxy-1:3:5-triazine and N-(β-hydroxyethyl-N)-(β-aminoethyl)aniline in acetone in the presence of sodium bicarbonate. A solution of 6.15 parts of anhydrous sodium acetate in 75 parts of water is then added and the mixture is stirred for 24 hours. The mixture is then filtered and the product is washed with water and dried at a temperature between 40° C. and 50° C. The product so obtained dyes nylon from a finely dispersed aqueous suspension to give orange shades of good fastness to washing.

The following table contains further examples of dyestuffs of the invention which may be obtained by coupling a diazotised aromatic amine as hereinbefore defined with a coupling component as hereinbefore defined.

| Example No. | Diazo Component | Coupling Component | Shade of product dyed on nylon |
|---|---|---|---|
| 4 | 2-chloro-4-ethyl-sulphonyaniline. | N-β(4-chloro-6-β-hydroxyethylamino-1:3:5-triazin-2-ylamino)-ethyl-N-ethylaniline. | Orange. |
| 5 | 2-amino-5-cyano-benzotrifluoride. | ......do............... | Bluish-red. |
| 6 | 2-amino-5-ethyl-sulphonylbenzo-trifluoride. | ......do............... | Pink. |
| 7 | 2:5-dichloro-4-aminobenzene-sulphon-N-methyl-amide | N-β-(4-chloro-6-β-hydroxyethyl-amino-1:3:5-triazin-2-ylamino) ethyl-N-β-hydroxyethyl-aniline. | Red. |
| 8 | 2:4-bis-methyl-sulphonyaniline. | ......do............... | Pink. |
| 9 | 2:4-bis-methyl-sulphonyaniline | N-β-[4-chloro-6-N-methylglucamyl-1:3:5-triazin-2-ylamino]-ethyl-N-ethylaniline. | Pink. |

The coupling components mentioned in the above table may be obtained by the following methods:

*N-β-(4-chloro-6-β-hydroxyethylamino-1:3:5-triazin-2-ylamino)-ethyl-N-ethylaniline*

A solution of 18.45 parts of cyanuric chloride in 125 parts of acetone is added to 150 parts of water at 0° C. To the slurry so obtained is added 16.4 parts of N-ethyl-N-β-aminoethylaniline dissolved in 125 parts of acetone keeping the temperature below 10° C. 10% sodium carbonate solution in water is added simultaneously to maintain neutrality. The insoluble N-β-(4:6-dichloro-1:3:5-triazin-2-ylamino)-ethyl-N-ethylaniline is filtered off and washed with water. 31.2 parts of the dried product are stirred with 200 parts of acetone and 12.2 parts of monoethanolamine is added. The mixture is heated at 45° C. for 1 hour. To the cooled mixture is then added 600 parts of cold water to precipitate the product. After stirring 1 hour the product is filtered off, washed until alkali free with water and dried. The N-β-(4-chloro - 6 - β - hydroxyethylamino - 1:3:5 - triazin - 2-ylamino)-ethyl-N-ethylaniline so obtained is a white solid, melting at a temperature between 178° C. and 179° C.

*N-β-(4-chloro-6-β-hydroxyethylamino-1:3:5-triazin-2-ylamino)-ethyl-N-β-hydroxyethylaniline*

If in the above process 18 parts of N-β-hydroxyethyl-N-β'-aminoethyl aniline are used in place of N-ethyl-N-β-aminoethylaniline the product obtained is N-β-(4-chloro - 6 - β - hydroxyethylamino - 1:3:5 - triazin - 2-ylamino) - ethyl - N - β - hydroxyethylaniline, melting at 140° C.

*N-β-(4-chloro-6-N-methylglucamyl-1:3:5-triazin-2-ylamino)-ethyl-N-ethylaniline*

31.2 parts of N - β - (4:6 - dichloro - 1:3:5 - triazin - 2-ylamino)-ethyl-N-ethylaniline, 19.5 parts of N-methylglucamine and 8.4 parts of sodium bicarbonate are stirred with a mixture of 165 parts of acetone and 100 parts of water. The mixture is heated at a temperature between 45° C. and 50° C. for 1½ hours. After cooling to 20° C. the product is filtered off, washed with cold water and dried. The compound so obtained is N-β-[4-chloro-6-N - methylglucamyl - 1:3:5 - triazin - 2 - ylamino] - ethyl-N-ethylaniline, melting at a temperature between 176° C. and 177° C.

This application is a divisional application of our copending application Serial No. 664,189, which was filed in the United States Patent Office on June 7, 1957.

What we claim is:

1. Water-insoluble dyestuffs of the formula:

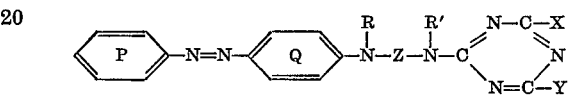

wherein:

R is selected from the group consisting of
   (a) lower alkyl, and lower alkyl substituted by a member selected from the class consisting of hydroxy, lower alkoxy, cyano, and fluorine, and
   (b) phenyl, and phenyl substituted by a member selected from the group consisting of lower alkyl, lower alkoxy, chlorine, and bromine;

R' is selected from the class consisting of hydrogen and β-hydroxyethyl;

Z is lower alkylene;

X is selected from the group consisting of bromine and chlorine atoms;

Y is selected from the class consisting of
   (a) the aliphatic radicals: lower alkyl, lower alkoxy, lower alkylamino, di-lower alkylamino, cyclohexylamino, β-hydroxyethylamino, di-(β-hydroxyethyl)amino, β-cyanoethylamino, hydroxyl and amino; and
   (b) the aromatic radicals: phenyl, phenoxy, phenylamino and thiophenoxy, wherein the phenyl rings carry substituents selected from the group consisting of hydrogen, lower alkyl, lower alkoxy, chloro, and bromo;

and rings P and Q are substituted by a member selected from the group consisting of hydrogen, lower alkyl, chloro, bromo, nitro, nitrile, lower alkoxy, lower alkylsulfonyl, aminosulfonyl, trifluoromethyl, amino, and acylamino.

2. Water-insoluble azo dyestuffs as claimed in claim 1 wherein the halogen atom represented by X is a chlorine atom.

3. Dyestuffs of claim 1 wherein Z is —CH₂CH₂—.

4. Dyestuffs of claim 3 wherein R is —CH₂CH₂OH and R' is H.

5. 2-chloro-4-ethylsulfonyl - 4'-N-β-hydroxyethyl-N-β-(4 - chloro - 6 - β - hydroxyethylamino - 1:3:5 - triazin-2-ylamino)ethylaminoazobenzene.

6. 2-chloro-4-ethylsulfonyl - 4'-N-β-hydroxyethyl-N-β-(4 - chloro - 6 - hydroxy - 1:3:5 - triazin - 2 - ylamino)-ethylaminoazobenzene.

References Cited in the file of this patent
UNITED STATES PATENTS
2,873,269    Fasciati et al. _____ Feb. 10, 1959